United States Patent [19]

Yu et al.

[11] Patent Number: 5,087,666
[45] Date of Patent: Feb. 11, 1992

[54] MODIFIED POLY(ARYLENE SULFIDE) COMPOSITION WITH IMPROVED IMPACT STRENGTH AND REDUCED SHRINKAGE

[75] Inventors: Michael C. Yu; John B. Allison, both of Bartlesville, Okla.

[73] Assignee: Phillips Petroleum Company, Bartlesville, Okla.

[21] Appl. No.: 550,783

[22] Filed: Jul. 10, 1990

[51] Int. Cl.$^5$ ................................................ C08L 81/00
[52] U.S. Cl. ........................................ 525/189; 525/64; 524/112; 524/531
[58] Field of Search ............... 524/112, 531; 525/189, 525/64

[56] References Cited

U.S. PATENT DOCUMENTS

| | | | |
|---|---|---|---|
| 4,134,874 | 1/1979 | Needham | 260/37 SB |
| 4,581,411 | 4/1986 | Liang et al. | 525/189 |
| 4,657,971 | 4/1987 | Shiraki et al. | 525/64 |
| 4,699,975 | 10/1987 | Katto et al. | 525/537 |
| 4,839,425 | 6/1989 | Mawatari et al. | 525/92 |
| 4,889,893 | 12/1989 | Kobayashi et al. | 525/189 |

FOREIGN PATENT DOCUMENTS

| | | | |
|---|---|---|---|
| 136847 | 10/1981 | Japan . | |
| 207921 | 11/1984 | Japan . | |
| 53356 | 3/1986 | Japan . | |
| 56559 | 8/1986 | Japan . | |
| 151460 | 6/1987 | Japan . | |
| 169854 | 7/1987 | Japan . | |
| 172056 | 7/1987 | Japan | 525/64 |
| 172057 | 7/1987 | Japan . | |
| 118369 | 5/1988 | Japan | 525/64 |

*Primary Examiner*—Melvyn I. Marquis
*Assistant Examiner*—Helen F. Lee
*Attorney, Agent, or Firm*—Morrison Bennett

[57] ABSTRACT

There are provided compositions comprising poly(arylene sulfide), polymeric rubber, polyethylene, and carboxylic anhydride; and methods for making these compositions. Articles produced from the compositions have reduced shrinkage and improved impact strength.

21 Claims, No Drawings

MODIFIED POLY(ARYLENE SULFIDE) COMPOSITION WITH IMPROVED IMPACT STRENGTH AND REDUCED SHRINKAGE

BACKGROUND OF THE INVENTION

This invention relates to compositions containing poly(arylene sulfide). In one of its aspects this invention relates to a method for preparing compositions of poly(arylene sulfide) which can be molded into articles having improved impact strength and reduced shrinkage.

Poly(arylene sulfide) is known to be useful as a molding composition. Among the characteristics of a molding composition that are important in determining the usefulness of the composition are the impact resistance or impact strength and the ease with which it can be injection molded or formed into useful products. Objects made with molding compositions which do not have good impact strength are less useful because without good impact strength the molded objects tend to chip, crack or break when impacted with another object.

When products are annealed after forming, shrinkage can cause such problems as shape distortion. Deviation in the amount of shrinkage from part to part and within parts can also cause manufacturing problems since it is difficult to engineer a process which can correct for variable shrinkage.

SUMMARY OF THE INVENTION

It is therefore an object of this invention to provide a method for improving the impact strength and reducing shrinkage of compositions containing poly(arylene sulfide), especially poly(phenylene sulfide). It is another object of this invention to provide compositions containing poly(arylene sulfide), especially poly(phenylene sulfide), which have improved impact strength and reduced shrinkage. It is still another object of this invention to provide molded objects having improved impact strength and reduced shrinkage.

In one embodiment of this invention a method is provided for improving the impact strength and reducing the shrinkage of a composition containing poly(phenylene sulfide) by combining a poly(phenylene sulfide) with a polymeric rubber, polyethylene, and a carboxylic anhydride, each in sufficient amounts and in the proportions needed to improve impact strength and reduce shrinkage.

The compositions of this invention are comprised of poly(arylene sulfide), a polymeric rubber, polyethylene, and carboxylic anhydride. Molded objects made with the compositions of this invention have improved impact strength and reduced shrinkage.

DETAILED DESCRIPTION OF THE INVENTION

The poly(arylene sulfide) resins employed in the compositions of this invention are known polymers which have been set forth, for example, in U.S. Pat. No. 3,354,129 which issued Nov. 21, 1967 to James T. Edmonds, Jr., and Harold Wayne Hill, Jr. The resins are normally solid materials which in an uncured or partially cured state can have melt flows according to ASTM Method D-1238-70 (316° C. and 5 kg load) ranging from about 1 g/10 minutes to about 10,000 g/10 minutes, more preferably from about 5 g/10 minutes to about 1000 g/10 minutes.

A presently preferred resin is poly(phenylene sulfide). From about 45 to about 98.5 weight percent of the composition, more preferably from about 58 to about 95 weight percent of the composition, and most preferably from about 70 to about 93 weight percent of the composition can be poly(phenylene sulfide).

The polymeric rubber used in the present invention is particularly effective for improving impact strength and crack resistance of poly(phenylene sulfide) when admixed therewith in amounts from about 0.3 to about 50 weight percent, preferably from about 0.5 to about 40 weight percent, and more preferably from 5 to 20 weight percent, based on total weight of the composition. Polymeric rubbers useful in this invention include one or more of any ethylene propylene copolymer rubber or any ethylene propylene diene monomer terpolymer rubber.

The carboxylic anhydrides useful in this invention include those with about three to ten carbon atoms with preferably at least one olefinic unsaturation and derivatives thereof. Examples of the carboxylic anhydride include maleic anhydride, norbornene-2,3-dicarboxylic anhydride (Nadic TM anhydride, methyl Nadic TM anhydride, tetrahydrophthalic anhydride, methyltetrahydrophthalic anhydride and mixtures of two or more of these carboxylic anhydrides. The amount of carboxylic anhydride is in the range from about 0.05 to about 5 weight percent, more preferably from about 0.1 to about 2 weight percent, and most preferably from about 0.1 to about 1 weight percent, based on total weight of the composition.

The polyethylene useful in this invention is a medium to high density polyethylene with a melt index of about 0.1 to 20 g/10 as measured by ASTM D1238, condition 190/2.16. The polyethylene has a density in grams per cubic centimeter of between about 0.935 and about 1.0 as measured by ASTM D1505. Most commercial polyethylenes have a number average molecular weight of about 50,000 to about 500,000. The polyethylenes having a density below about 0.96 g/cc are produced by copolymerizing ethylene with a small amount of at least one mono-1-olefin having 3 to 12, preferably 4 to 10 carbon atoms per molecule. Generally this results in about 0.4 to 3 weight percent copolymer incorporation based on the total weight of the polymer.

The amount of polyethylene useful in this invention is in the range from about 1 to about 20 weight percent, more preferably from about 2 to about 15 weight percent, and most preferably from about 2 to about 10 weight percent, based on total weight of the composition.

The amount of carboxylic anhydride useful in this invention is in the range from about 0.05 to about 5 weight percent, more preferably from about 0.1 to about 2 weight percent, and most preferably from about 0.1 to about 1 weight percent, based on total weight of the composition.

The compositions of this invention can optionally contain reinforcement materials such as glass in the form of fibers or beads. It is also within the scope of this invention that the composition contain mineral fillers such as silica, clay, talc, calcium carbonate, and the like, or other conventional fillers.

Processing aids such as lithium carbonate or oils or waxy compounds selected from among the N,N-alkylenebis(alkanamides), glyceride and phosphated glycerides of satured fatty acids containing from 10 to 30 carbon atoms, mono-and dialkanolamides derived from saturated fatty acids and esters derived from a saturated long chain fatty acid and long chain saturated aliphatic alcohol are also contemplated as useful in this invention. Other additives can include colorants such as carbon black, titanium dioxide, cadmium sulfide, cadmium sulfoselenide, phthalocyanine blue, iron oxide, and the like.

In the preparation of the compositions of this invention the order of addition is not important. Any known means of mixing the components can be used; preferably dry ingredients can be tumble mixed and subsequently extruded and ground to form a homogeneous powder. The powder can then be reheated for molding.

The following examples will be used to describe the invention and should be taken as illustrative and not restrictive.

EXAMPLES

The poly(phenylene sulfide) resin was dried in a forced air oven at 225° F. for at least 4 hours before compounding. Maleic anhydride powder was sprinkled onto the poly(phenylene sulfide) particles and mixed. All compounds shown in the following tables were prepared by tumble blending poly(phenylene sulfide) the poly(phenylene sulfide)/maleic anhydride mixture with polyethylene and polymeric rubber particles or pellets such as ethylene propylene diene monomer rubber in a plastic bag. Control runs were made using poly(phenylene sulfide) without any maleic anhydride, e.g., compound 5. Other control runs were made without any polyethylene, e.g. compound 1. The dry blended compounds were then melt blended in a 30 mm, co-rotating Werner Pfleiderer twin screw extruder at 310°-320° C. with an open vent and pelletized.

The test specimens were molded on an Arburg 305 ECO or ENGEL injection machine using a barrel temperature of 600° F. and a mold temperature of 100° F.

The samples were annealed at 400° F. for 2 hours in a forced air oven between two metal plates to prevent buckling of the specimens due to shrinkage.

The notched and unnotched izod impact strength was measured on both gated and nongated impact bars. Percentage of shrinkage was measured on 6 tensile bars for each sample. The results are shown in the following tables.

TABLE 1

Impact Strengths and Shrinkages of Impact Modified PPS

|  | Compound 1 | Compound 2 | Compound 3 | Compound 4 |
|---|---|---|---|---|
| Components |  |  |  |  |
| Poly(phenylene sulfide)[a] (wt. %) | 79.6 | 79.6 | 79.6 | 79.6 |
| Ethylene Propylene Diene Monomer[b] (wt. %) | 20 | 17 | 13.4 | 6.6 |
| Polyethylene[c] (wt. %) | 0 | 3.0 | 6.6 | 13.4 |
| Maleic Anhydride (wt. %) | 0.4 | 0.4 | 0.4 | 0.4 |
| Properties |  |  |  |  |
| Shrinkage (%) | 3.33 | 2.82 | 2.71 | ND[d] |
| Standard Deviation in Shrinkage (%) | 1.26 | 0.85 | 0.49 | ND[d] |
| Notched Izod Impact (ft-lb/in) | 7.2 | 7.1 | 7.3 | 1.8 |

[a] A high molecular weight poly(phenylene sulfide) with a flow rate of 55 was used.
[b] Nordel TM 1145, an ethylene propylene diene monomer elastomer having 1,4-hexadiene as the diene monomer, available commercially from DuPont, was used.
[c] Polyethylene with a melt index of 3 was used.
[d] Not determined.

Tensile bars made with an absence of polyethylene in the composition (Compound 1) had 3.3% shrinkage upon annealing and standard deviation of 1.26%. With addition of 3.0% weight percent of polyethylene to the composition (Compound 2), the shrinkage and deviation were reduced to 2.82% and 0.85%, respectively. The above table also shows that with a larger quantity of polyethylene added to the composition (Compound 3), the shrinkage and standard deviation further decrease. It is therefore concluded that in tensile bars made with poly(phenylene sulfide) compounds containing ethylene propylene diene monomer terpolymer, the incorporation of polyethylene reduces both shrinkage and standard deviation of shrinkage.

The results shown in Table 1 indicate that polyethylene had little effect on the impact strength of the molded tensile bars. It is concluded that maleic anhydride is required to maintain high impact strength of the molded articles made from poly(phenylene sulfide) resins when polyethylene is added to improve shrink properties.

TABLE 2

Impact Strength of Impact Modified PPS

|  | Compound 5 | Compound 6 | Compound 7 |
|---|---|---|---|
| Poly(phenylene sulfide)[a] (wt. %) | 80 | 79.6 | 79.6 |
| Ethylene Propylene Diene Monomer (wt. %) | 17[b] | 17[b] | 20[c] |
| Polyethylene[d] (wt. %) | 3 | 3 | 0 |
| Maleic Anhydride (wt. %) | 0 | 0.4 | 0.4 |
| Notched Izod Impact Strength (ft-lb/in) | 1.2 | 7.2 | 5.9 |

[a] A high molecular weight poly(phenylene sulfide) with a flow rate of 73 was used.
[b] Nordel TM 5501 was used. Nordel TM 5501 is an ethylene propylene diene monomer mixture of 85 weight percent Nordel TM 1145 and 15 weight percent polyethylene with a melt index of 3. Nordel TM 1145 is an ethylene propylene diene monomer elastomer having 1,4-hexadiene as the diene monomer. Both Nordel TM 5501 and Nordel TM 1145 are available commercially from DuPont.
[c] Nordel TM 1145, an ethylene propylene diene monomer elastomer having 1,4-hexadiene as the diene monomer, commercially available from DuPont, was used.
[d] Polyethylene with a melt index of 3 blended with the ethylene propylene diene monomer elastomer and sold as Nordel TM 5501 was used.

While the compositions, processes and articles of this invention have been described in detail for the purpose of illustration, the inventive compositions, processes and articles are not to be construed as limited thereby. This patent is intended to cover all changes and modifications within the spirit and scope thereof.

That which is claimed is:

1. A composition consisting essentially of poly(arylene sulfide), a polymeric rubber, a polyethylene and an unsaturated carboxylic anhydride.

2. A composition as recited in claim 1 wherein said polymeric rubber is ethylene propylene diene monomer terpolymer.

3. A composition as in claim 2 wherein said poly(arylene sulfide) is present in an amount in a range from about 45 to about 98.5 weight percent based on total weight of said composition, said ethylene propylene diene monomer terpolymer is present in an amount in a range of about 0.3 to about 50 weight percent based on total weight of said composition, said polyethylene is present in an amount in a range of about 1 to about 20 weight percent based on total weight of said composition, and said unsaturated carboxylic anhydride is present in an amount in a range of about 0.05 to about 5 weight percent based on total weight of said composition.

4. A composition as in claim 2 wherein said poly(arylene sulfide) is present in an amount in a range from about 58 to about 95 weight percent based on total weight of said composition, said ethylene propylene diene monomer terpolymer is present in an amount in a range of about 3 to about 25 weight percent based on total weight of said composition, said polyethylene is present in an amount in a range of about 2 to about 15 weight percent based on total weight of said composition, and said unsaturated carboxylic anhydride is present in an amount in a range of about 0.1 to about 2 weight percent based on total weight of said composition.

5. A composition as in claim 2 wherein said poly(arylene sulfide) is present in an amount in a range from about 70 to about 93 weight percent based on total weight of said composition, said ethylene propylene diene monomer terpolymer is present in an amount in a range of about 5 to about 20 weight percent based on total weight of said composition, said polyethylene is present in an amount in a range of about 2 to about 10 weight percent based on total weight of said composition, and said unsaturated carboxylic anhydride is present in an amount in a range of about 0.1 to about 1 weight percent based on total weight of said composition.

6. A composition as in claim 2 wherein said poly(arylene sulfide) is poly(phenylene sulfide), and said unsaturated carboxylic anhydride is maleic anhydride.

7. A composition as recited in claim 6 wherein said polyethylene has a melt index from about 0.1 to about 20 and said polyethylene has a density in grams per cubic centimeter from about 0.935 to about 1.0.

8. A composition as recited in claim 2 wherein said polymeric rubber is an ethylene propylene copolymer.

9. A composition as in claim 8 wherein said poly(arylene sulfide) is present in an amount in a range from about 45 to about 98.5 weight percent based on total weight of said composition, said ethylene propylene copolymer is present in an amount in a range of about 0.5 to about 50 weight percent based on total weight of said composition, said polyethylene is present in an amount in a range of about 1 to about 20 weight percent based on total weight of said composition, and said unsaturated carboxylic anhydride is present in an amount in a range of about 0.05 to about 5 weight percent based on total weight of said composition.

10. A composition as in claim 8 wherein said poly(arylene sulfide) is present in an amount in a range from about 58 to about 95 weight percent based on total weight of said composition, said ethylene propylene copolymer is present in an amount in a range of about 3 to about 25 weight percent based on total weight of said composition, said polyethylene is present in an amount in a range of about 2 to about 15 weight percent based on total weight of said composition, and said unsaturated carboxylic anhydride is present in an amount in a range of about 0.1 to about 2 weight percent based on total weight of said composition.

11. A composition as in claim 8 wherein said poly(arylene sulfide) is present in an amount in a range from about 70 to about 93 weight percent based on total weight of said composition, said ethylene propylene copolymer is present in an amount in a range of about 5 to about 20 weight percent based on total weight of said composition, said polyethylene is present in an amount in a range of about 2 to about 10 weight percent based on total weight of said composition, and said unsaturated carboxylic anhydride is present in an amount in a range of about 0.1 to about 1 weight percent based on total weight of said composition.

12. A composition as in claim 8 wherein said poly(arylene sulfide) is poly(phenylene sulfide), and said unsaturated carboxylic anhydride is maleic anhydride.

13. A composition as in claim 12 wherein said polyethylene has a melt index from about 0.1 to about 20 and a density in grams per cubic centimeter from about 0.935 to about 1.0.

14. A method for making a composition comprising combining components consisting essentially of poly(arylene sulfide), polymeric rubber, polyethylene and an unsaturated carboxylic anhydride and thereafter melt blending.

15. A method as recited in claim 14 wherein said polymeric rubber is an ethylene propylene diene monomer terpolymer.

16. The method of claim 15 wherein said melt blending is carried out by passing said mixture through an extruder at a temperature above the melting point of said poly(arylene sulfide) resin.

17. A method as recited in claim 14 wherein said polymeric rubber is an ethylene propylene copolymer.

18. The method of claim 17 wherein said melt blending is carried out by passing said mixture through an extruder at a temperature above the melting point of said poly(arylene sulfide) resin.

19. A product made by the method of claim 14.
20. A product made by the method of claim 15.
21. A product made by the method of claim 17.

* * * * *